9621X
Frazier. Blanchard & Gill,
Cook Stove.
Patented Apr. 28. 1836.
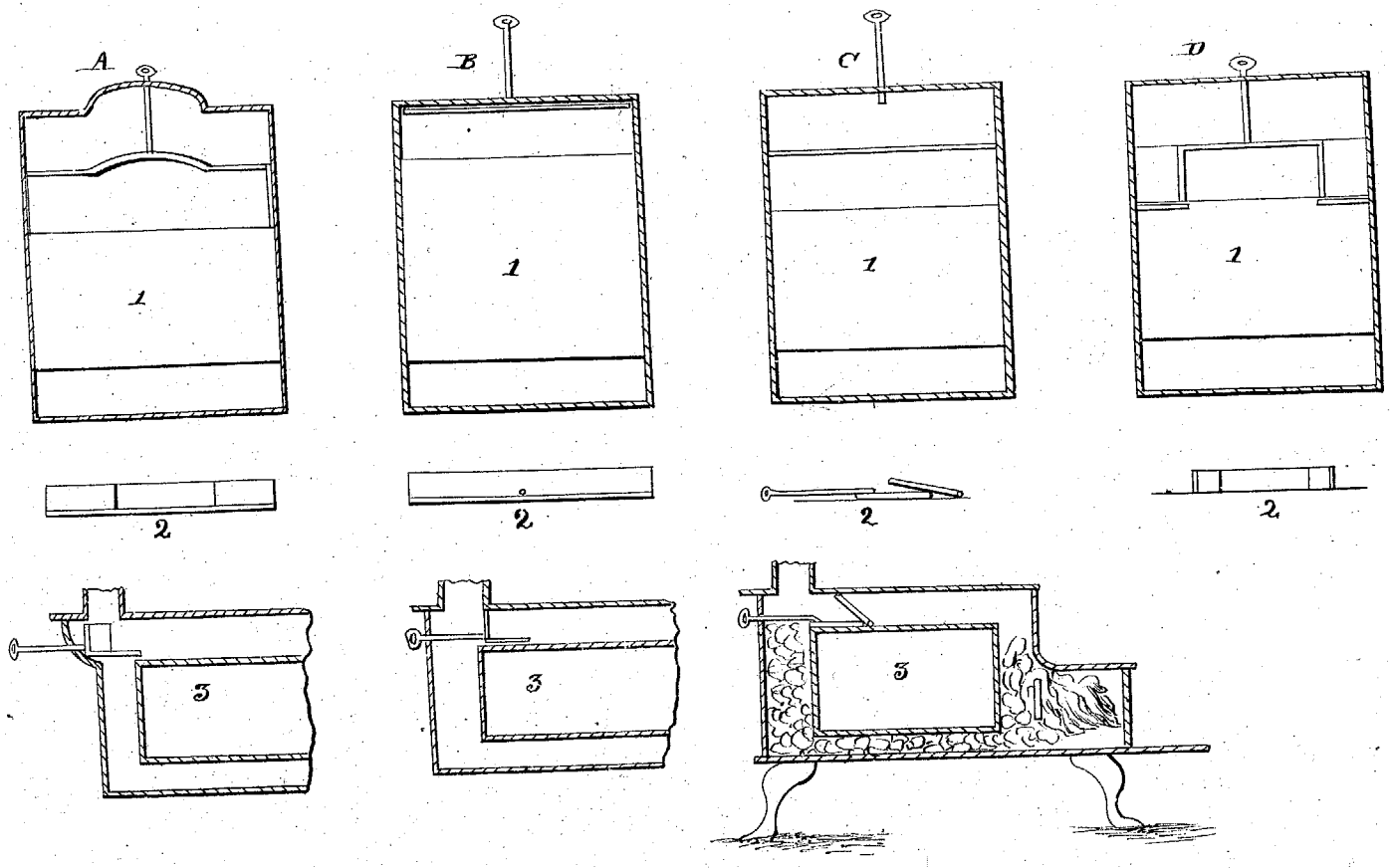

9621 X

Apl 28. 1836

Thomas Frazier Hiram Blanchard & Bennington Gill of N.Y. City

Letters Patent.

The Schedule referred to in these Letters Patent & making part of the same con-
taining a description in the words of the said, Thomas Frazier, Hiram Blan-
chard and Bennington Gill themselves of their improvement in cooking & other sto[ves]

To all to whom these presents shall come. Know Ye that We Thom-
as Frazier Hiram Blanchard and Bennington Gill of the City County and Sta[te]
of New York have invented constructed made and applied to use new
and useful improvements in cooking and other stoves called "the im-
proved Stove dampers" which improvements are described as follow[s]
First. We make a damper of cast iron or other suitable material
13 inches long 1/4 of an inch thick and 1 3/4 inches Broad. having a
flange of the same length and thickness and 1 3/4 inch broad as shown in fig
nos 1. 2 & 3. of the annexed drawing marked B. which damper is intend[ed]
to be placed between the top plate and the top oven plate of the cooking
Stove near the opening into the smoke pipe. in such manner that wh[en]
the Damper is drawn back as shown in Figure 1. drawing B. the flat
part of the damper closes the passage which leads from the fire in fron[t]
of the stove under the bottom and around the back of the oven to th[e]
smoke pipe. leaving the passage from the fire to said pipe along th[e]
front and over the top of the oven. open. or if the damper is pushed
forward as shown in Fig. B No 3. then the upright part of the damp[er]
closes the passage which leads over the oven. leaving that which leads un-
der and behind it open. Or if the damper is drawn only part way
back the heat and smoke will circulate through both passages at
the same time to the pipe. The aforesaid dampers may be varied in
form. some having circular backs as shown in figures marked A. No
1. 2. 3. others having the upright flange extending part way only along
the back of the dampers. and then crossing it so as to meet vertical projec-
tions extending from the sides of the stoves part way towards the middl[e]
of the top oven plate as shown in figure C No 1. of the annexed draw-
ing. and such other shapes and dimensions may be adopted as the-

9621 X 4-28-1836 and sizes of the stoves in which they are used may require. Second We make a damper of cast Iron or other suitable material 13 inches long 1/4 of an inch thick and 2 inches broad having a short axle at each end to revolve in holes made in the side plates of the stove as shown in figure 6 No 1 & 3. or in recesses made in the inner sides of said plates just above the top of the oven. under this we place another flat damper sliding upon the top oven plate. of such dimensions. that when drawn back against the back of the Stove as shewn in figure 6 No 1. its edge shall still remain under the edge of the revolving damper in which position it closes the lower passage to the stove pipe and permits the revolving damper to fall so as to leave the passage over the oven clear. and when said sliding damper is pushed forward so as to open the lower passage to the stove pipe. it at the same time raises the revolving damper so as to close the upper one see figure 6 No 3. or by being pushed only part way forward. it raises the revolving damper only part way and thus leaves both passages partially open. These dampers are also made of various dimensions to suit the stoves to which they are to be applied. The part of the cooking Stove in which our improvement is made is that which lies between the top of the oven and the top of the Stove. and it consists in the new arrangements above described. so as effectually to distribute and guide the heat when generated over or under or around the oven and to the objects or objects for which it is wanted, in such proportion. and in such times and in such manner as may be required. This is effected by arranging the dampers or valves to close in part or whole as may be required. the passages through which the flame and heat ascend and the internal arrangement and construction of the above described parts in and upon the upper part of the stove. the whole being combined in such manner as to produce the desired results. We claim as our invention and improvement the construction arrangement and combination of the above described dampers or valves with the interior of the top of the cooking Stove and any other similar arrangement and combination of similar parts for the same pu

9621 X 4-28-1836

14

Pressplaced in the top of a stove for the purposes aforesaid. and for this improvement We request Letters Patent.

Witnesses
Allen A Gill
Wm Frazier

Thomas Frazier
Hiram Blanchard
Barrington Gill

Drawing